(No Model.)

J. G. MUNROE.
CHURN.

No. 244,920. Patented July 26, 1881.

WITNESSES

*James G. Munroe,*
INVENTOR,

By his Attorneys
*Louis Bagger & Co.*

UNITED STATES PATENT OFFICE.

JAMES G. MUNROE, OF FAYETTEVILLE, NORTH CAROLINA.

CHURN.

SPECIFICATION forming part of Letters Patent No. 244,920, dated July 26, 1881.

Application filed May 19, 1881. (No model.)

*To all whom it may concern:*

Be it known that I, JAMES G. MUNROE, of Fayetteville, in the county of Cumberland and State of North Carolina, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification, and in which—

Figure 1:
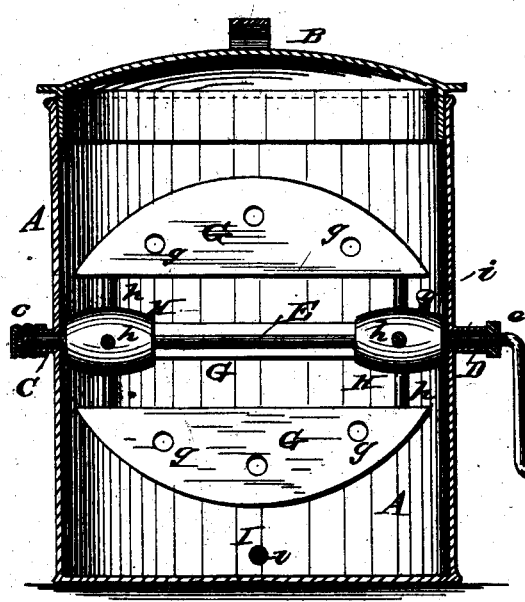
Figure 2:
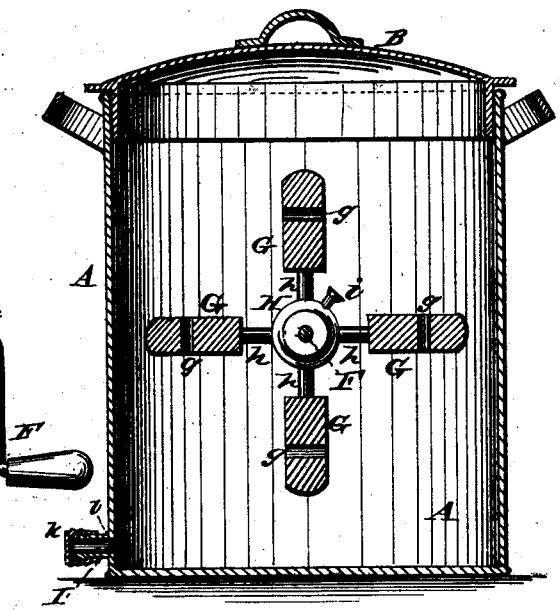
Figure 3:
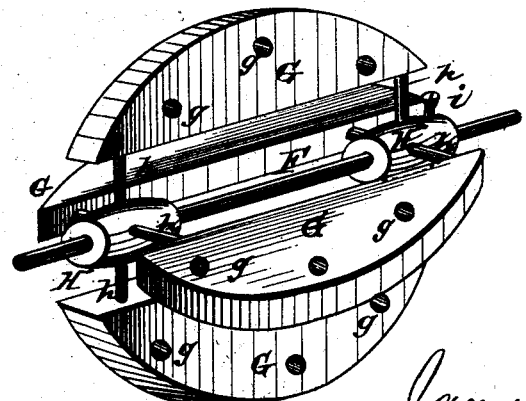

Figure 1 is a vertical central section of my improved churn. Fig. 2 is a similar section at right angles to the section shown in Fig. 1, and Fig. 3 is a perspective view of the rotary dasher detached.

Similar letters of reference indicate corresponding parts in all the figures.

My invention contemplates an improvement in rotary churns, as hereinafter more fully described, and particularly pointed out in the claim.

In the annexed drawings, A represents the cream-receptacle or churn-box, which is cylindrical in shape and provided with a closely-fitting flanged cover, B. About at an equal distance from the top and bottom of the cylinder is, on one side, a projecting tube, C, which is closed by a screw-cap, c, and on the other side, exactly opposite thereto, is another tube, D. These projecting tubes C and D form bearings for the horizontal dasher-shaft E, which has a crank, F, for operating it, and is provided with a rubber or other elastic washer, e, which impinges upon the outer end of the open tube D in the nature of a packing to close the outlet without interfering in the least with the operation of the crank and shaft.

The dasher or stirrer is composed of four segmental blades, G, having perforations g and secured at right angles to one another upon central hubs or boxes, H H, by means of arms h h, one at each end of the dasher-blade. One or both of the hubs has a set-screw, i, for fastening it upon the shaft E, which is inserted centrally through them. In the side of the churn-box, near the bottom, is a tubular outlet, I, which has a screw-cap, k, at its outer end and a strainer, l, at its inner end.

This churn (the operation of which will be readily understood without further description) agitates the cream thoroughly and causes the butter to come quickly. It is easily operated and cleaned, and is so simple that it can be manufactured at a small expense.

Having thus described my invention, I claim and desire to secure by Letters Patent of the United States—

The combination of the cylindrical churn-body A, having cover B and tubular projecting bearings C D, constructed and arranged as set forth, dasher-shaft E, having crank F and elastic washer e, and dasher composed of the perforated segments G, secured at right angles to one another upon centrally-perforated hubs H H, having set-screw i, substantially as and for the purpose herein shown and specified.

In testimony that I claim the foregoing as my own I have hereunto affixed my signature in presence of two witnesses.

JAMES G. MUNROE.

Witnesses:
R. W. THORNTON,
T. J. UNDERWOOD.